(12) United States Patent
Suenbuel et al.

(10) Patent No.: US 8,108,234 B2
(45) Date of Patent: Jan. 31, 2012

(54) SYSTEM AND METHOD FOR DERIVING BUSINESS PROCESSES

(75) Inventors: Asuman Suenbuel, San Jose, CA (US); Ike Nassi, Los Gatos, CA (US)

(73) Assignee: SAP AG, Walldorf (DE)

( * ) Notice: Subject to any disclaimer, the term of this patent is extended or adjusted under 35 U.S.C. 154(b) by 1358 days.

(21) Appl. No.: 11/717,425

(22) Filed: Mar. 13, 2007

(65) Prior Publication Data

US 2008/0228536 A1    Sep. 18, 2008

(51) Int. Cl.
*G06F 9/44* (2006.01)
(52) U.S. Cl. ..................................... 705/7.11
(58) Field of Classification Search ............. 705/7, 7.11, 705/7.29
See application file for complete search history.

(56) References Cited

U.S. PATENT DOCUMENTS

| | | | | |
|---|---|---|---|---|
| 6,278,977 | B1 * | 8/2001 | Agrawal et al. | 705/7 |
| 2002/0010679 | A1 * | 1/2002 | Felsher | 705/51 |
| 2003/0187676 | A1 * | 10/2003 | Hack et al. | 705/1 |
| 2005/0234976 | A1 * | 10/2005 | Oara et al. | 707/103 R |
| 2008/0228536 | A1 * | 9/2008 | Suenbuel et al. | 705/7 |

OTHER PUBLICATIONS

Business process mining: An Industrial application—by Aalst et al Science Direct May 31, 2006.*
Baxter, et al., "A Standards-Based Approach to Extracting Business Rules," Semantic Designs. http://www.omg.org/news/meetings/workshops/ADM_2005_Proceedings_FINAL/1-3_Bacter-Nedryx.pdf, 2005.
Gunther, et al., "Mining Activity Clusters From Low-Level Event Logs" http://is.tm.tue.nl/staff/wvdaalst/BPMcenter/reports/2006/BPM-06-11.pdf, 2006.
Maruster, "A Machine Learning Approach to Understand Business processes" http://alexandria.tue.nl/extra2/200312219.pdf, 2003.
Voth, "Minding Your Business with AI," IEEE Intelligent Systems, Jul./Aug. 2005, pp. 4-9.
Viharos, et al., "Optimisation of Process Chains and Production Plants Using Hybrid, AI- and Simulation Based General Process Models," Computer and Automation Research Institute, Hungary http://www.sztaki.hu/~viharos/homepage/Publications/2001_SPRINGER_IEAofAIE/SPRINGER_2001.htm, 2001.
W.M.P. van der AALST, et al., "Workflow Mining: Discovering Process Models from Event Logs,", IEEE Transactions on Knowledge and Data engineering (TKDE), Accepted for Publication, 2003.
A.K.A. de Medeiros et al., "Process Mining: Extending the α-algorithm to Mine Short Loops," BETA Working Paper Series, WP 113, Eindhoven University of Technology, Eindhoven, 2004.
Laura Maruster et al., "Process Mining: Discovering Direct Successors in Process Logs," In Proceedings of the 5th International Conference on Discovery Science (Discovery Science 2002), vol. 2534 of Lecture Notes in Artificial Intelligence, pp. 364-373. Springer-Verlag, Berlin, 2002.

(Continued)

Primary Examiner — Beth V Boswell
Assistant Examiner — Ernest A Jackson
(74) Attorney, Agent, or Firm — Fountainhead Law Group P.C.

(57) ABSTRACT

Embodiments of the present invention improve derivation of business processes. In one embodiment, the present invention includes a method of deriving business processes, the method comprising accessing a plurality of event logs, accessing predefined domain rules, associating the event logs with one or more business processes using a first plurality of the domain rules, and deriving a specification for one or more business processes based on a second plurality of the domain rules.

12 Claims, 8 Drawing Sheets

OTHER PUBLICATIONS

B.F. van Dongen e al., "The ProM Framework: A New Era in Process Mining Tool Support," 26th International Conference on Applications and Theory of Petri Nets (ICATPN 2005), G. Ciardo and P. Darondeau, LNCS 3536, pp. 444-454, 2005. © Springer-Verlag Berling Heidelberg 2005.

A.J.M.M. Weijters et al., "Rediscovering Workflow Models from Event-Based Data Using Little Thumb," Integral Computer-Aided Engineering, 10(2):151-162, 2003.

Christian W. Guenther et al., "A Generic Import Framework for Process Event Logs," Business Process Management Workshops, Workshop on Business Process Intelligence (BPI 2006), vol. 4103 of Lecture Notes in Computer Science.

A.J.M.M. Weijters et al., "Process Mining: Discovering Workflow Models from Event-Based Data," In Proceedings of the Third International NAISO Symposium on Engineering of Intelligent Systems (EIS 2002), pp. 65-65, NAISCO Academic Press, Sliedrecht, The Netherlands, 2002.

Ana Karla Alves De Medeiros and A.J.M.M. Weijters, "ProM Framework Tutorial," Technische Universiteit Eindhoven, Eindhoven, The Netherlands, Nov. 2006.

* cited by examiner

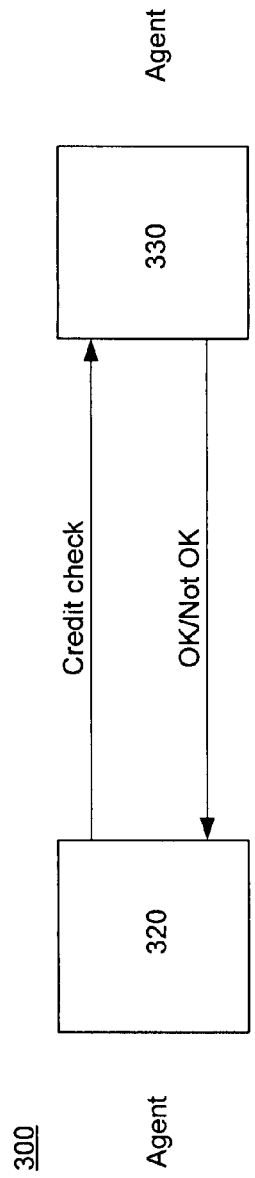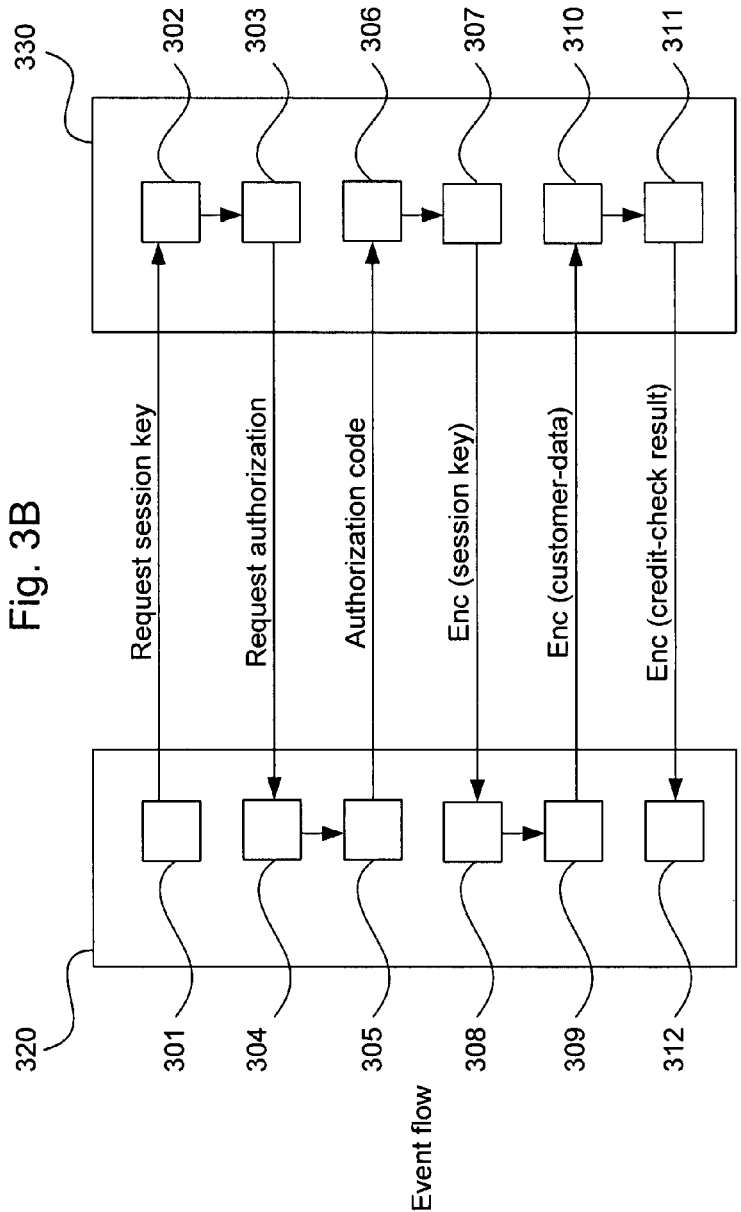

SYSTEM AND METHOD FOR DERIVING BUSINESS PROCESSES

BACKGROUND

The present invention relates to deriving business processes, and in particular, to a system and method for deriving business processes from events.

Maintenance and optimization of computer systems are very important tasks for many businesses. Many processes implemented on a computer are performed using a variety of software systems that may be very old and not optimized to take advantage of state-of-the-art technologies. Such systems are commonly referred to as legacy software systems. It is often desirable to migrate business software processes to newer and more modern software architectures to enhance performance and functionality. However, migrating software processes to new systems typically requires detailed analysis of the source code and recreation of the code base using modern programming techniques. Accordingly, process migration can be time consuming and expensive.

Additionally, it is often desirable to acquire an understanding of the structure of processes carried out by legacy code to gain knowledge of a computer system's usage. This can provide valuable data when performing maintenance tasks on a system or ensuring that the code is operating as expected. An in-depth understanding of the processes performed by a computer system can be used to analyze weaknesses in programming code of legacy software by discovering which tasks and/or subtasks consume the most time and resources. A previously undetected resource bottleneck can be uncovered and process improved, for example.

Thus, it is desirable to have a system and method to derive computer-implemented business processes that do not require analysis of source code. The present invention solves these and other problems by providing a system and method for deriving business processes from events.

SUMMARY

Embodiments of the present invention improve derivation of business processes. In one embodiment, the present invention includes a method of deriving business processes, the method comprising accessing a plurality of event logs, accessing predefined domain rules, associating the event logs with one or more business processes using a first plurality of the domain rules, and deriving a specification for one or more business processes based on a second plurality of the domain rules and associating the event logs with one or more business processes using the domain rules.

In one embodiment, the method further comprises specifying the domain rules.

In one embodiment, the event logs are accessed from a plurality of different software systems.

In one embodiment, the method further comprises associating the plurality of event logs with two or more different business processes.

In one embodiment, the method further comprises associating one or more event logs associated with a first business process with a sub-process of said first business process.

In one embodiment, the method further comprises generating code to execute the business process.

In one embodiment, the method further comprises deriving a plurality of business process components from the event logs based on the domain rules.

In one embodiment, the method further comprises combining the business process components together to form a complete business process using said domain rules.

In one embodiment, the resulting process specification is XML.

In one embodiment, event logs from multiple systems are retrieved and combined on a single system.

The following detailed description and accompanying drawings provide a better understanding of the nature and advantages of the present invention.

BRIEF DESCRIPTION OF THE DRAWINGS

FIGS. 3B-C illustrate an example step of a business process and associated events that may be used in deriving a business process according to embodiments of the present invention.

DETAILED DESCRIPTION

Described herein are techniques for deriving business processes. The following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include obvious modifications and equivalents of the features and concepts described herein.

Embodiments of the present invention includes a system and method for deriving business processes. When business processes are executed, the software typically generates event logs that act as a record of the activities of the system. In one embodiment, the event logs may be accessed and used to derive the business processes that were used to create the events. Embodiments of the present invention may include using domain rules to create an association between event logs and business processes. Event logs may be accessed and applied with the domain rules to extract business processes that were used by software (e.g., legacy software), for example, in generating the events in the event logs.

Figure 1:
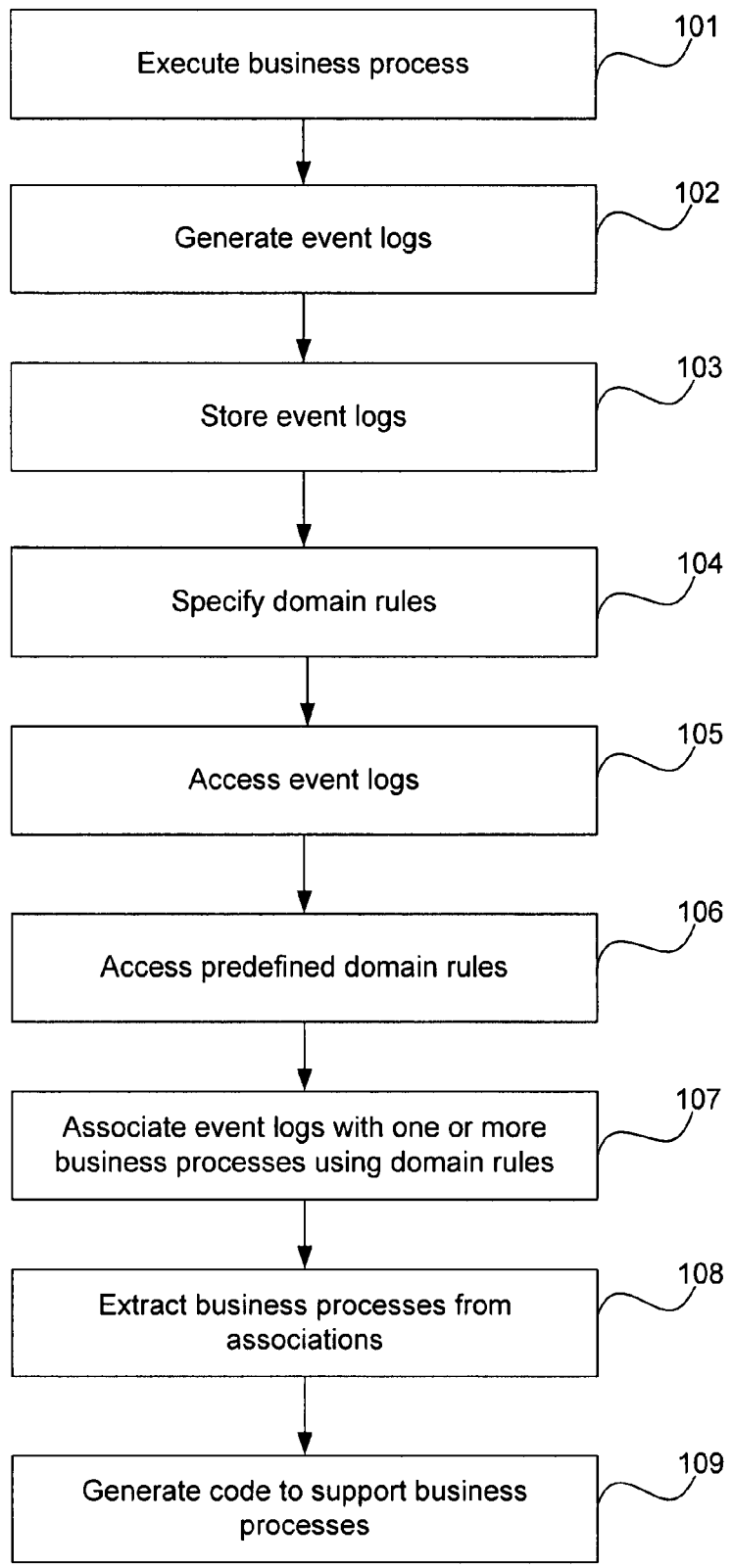
FIG. 1 illustrates a method of deriving business processes according to one embodiment of the present invention.

FIG. 1 illustrates a method of deriving business processes according to one embodiment of the present invention. While the method below is illustrated here as a sequence, it is to be understood that some of the steps may be executed in parallel with other steps. At 101, a business process is executed. A business process comprises the execution of a sequence of one or more process steps. It may have clearly defined deliverables or outcomes. A business process may be defined by the business event that triggers the process, the inputs and outputs, the operational steps required to produce the output, the sequential relationship between the process steps, the business decisions that are part of the event response, or the flow of material or information between process steps. In general, a business process can be modeled as a sequence of (possibly parallel) actions performed by each of the agents participating in the process, and the message exchanges among them. A business process may be executed on one or more software systems or components (agents). Agents usually represent software systems, but can also involve human interaction. As the business process is executed, the supporting software will typically generate event logs for the various activities triggered by the business process. The activities are observable events. The observable events of a business process may include the message exchanges between the agents and published internal events of the participating agents for example. These observable event logs are the basis of the initial business process analyses and may be used to detect lowest level business process structures, which are then subject to the business process structuring rules. At 102, the event logs are generated by a software system executing a particular step of a business process. At 103, the event logs may be stored. For example, some software systems may store event logs in a database of event logs. If multiple business processes are supported by the system, the system may store event logs from multiple business processes together in a single location, for example.

At 104, domain rules are specified. Domain rules create an association between event logs and business processes. In some applications, event logs may be used to recreate a code base for supporting a variety of existing business processes running on a code base (e.g., a legacy code base). Accordingly, domain rules may be specified by domain experts who may have specialized knowledge of the legacy code or the business processes or both. Rules may transform events into business process components (or steps), as described in more detail below. The rules may also combine identifiable business process components into the complete process. Some embodiments of the present invention may include a business process extractor software component (BPE), which may access event logs and output the business processes that created the event logs. Domain rules may be specified by a domain expert and provided as an input to the BPE. Alternatively, a BPE may include integrated functionality for allowing a domain expert to specify domain rules for a variety of accessible systems. An example of domain rules that may be used in embodiments of the present invention to analyze log data is provided in the Appendix below. At 105, the event logs are accessed. For example, event logs for a system running a business process step may be retrieved from database storage by a BPE. Once the log messages are retrieved, the predefined domain rules are accessed at 106. Using these predefined domain rules, event logs may be associated with one or more business processes at 107. For example, one or more event logs associated with the same business process may be clustered together and used to extract a business processes structure. Accordingly at 108, business processes are extracted from these associations. At this step, basic process schemes may be identified. In some applications, this information may be used as input to generate code to support business processes at 109.

Figure 2:
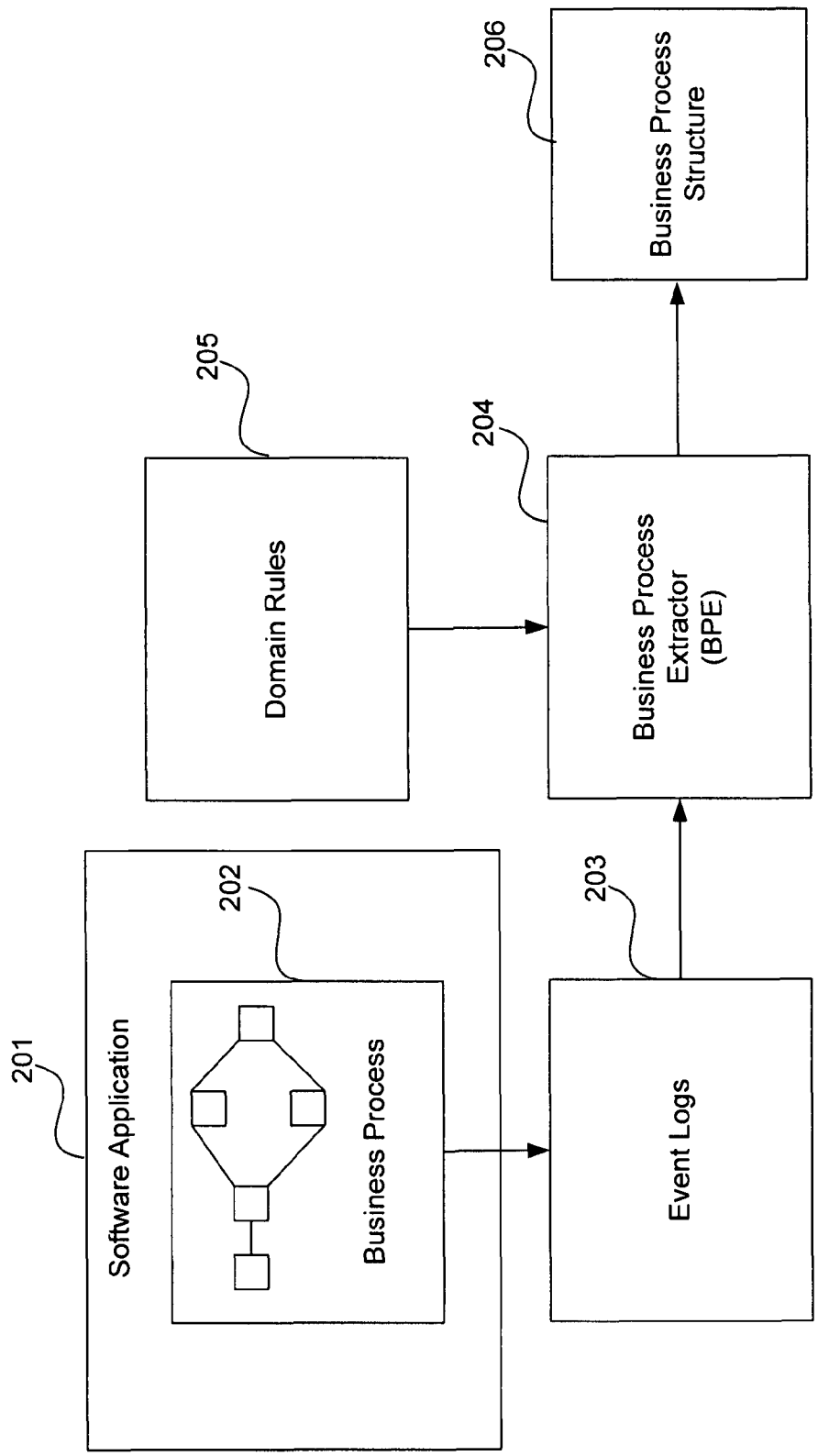
FIG. 2 illustrates a system for deriving business processes according to one embodiment of the present invention.

FIG. 2 illustrates a system for deriving business processes according to one embodiment of the present invention. A software application 201 executes a business process 202. The business process may be integrated into the software system code, or the business process may be specified using, for example, a business process markup language ("BPML"), for example. During execution of business process 202, event logs 203 are generated by application 201. Events may include messages exchanged between systems or internal events of a single system, or both, for example. The event logs 203 may be stored in memory such as a cache, database, log file, or similar mechanism for capturing system events. A business process extractor ("BPE") 204 may access the event logs 203. Once the event logs are retrieved, the BPE 204 may access domain rules 205. BPE 204 may process the event logs using the domain rules to generate the business process 206, representing the structure of the business process as a specification such as XML, as a graph, or as a language, for example.

Figure 3A:
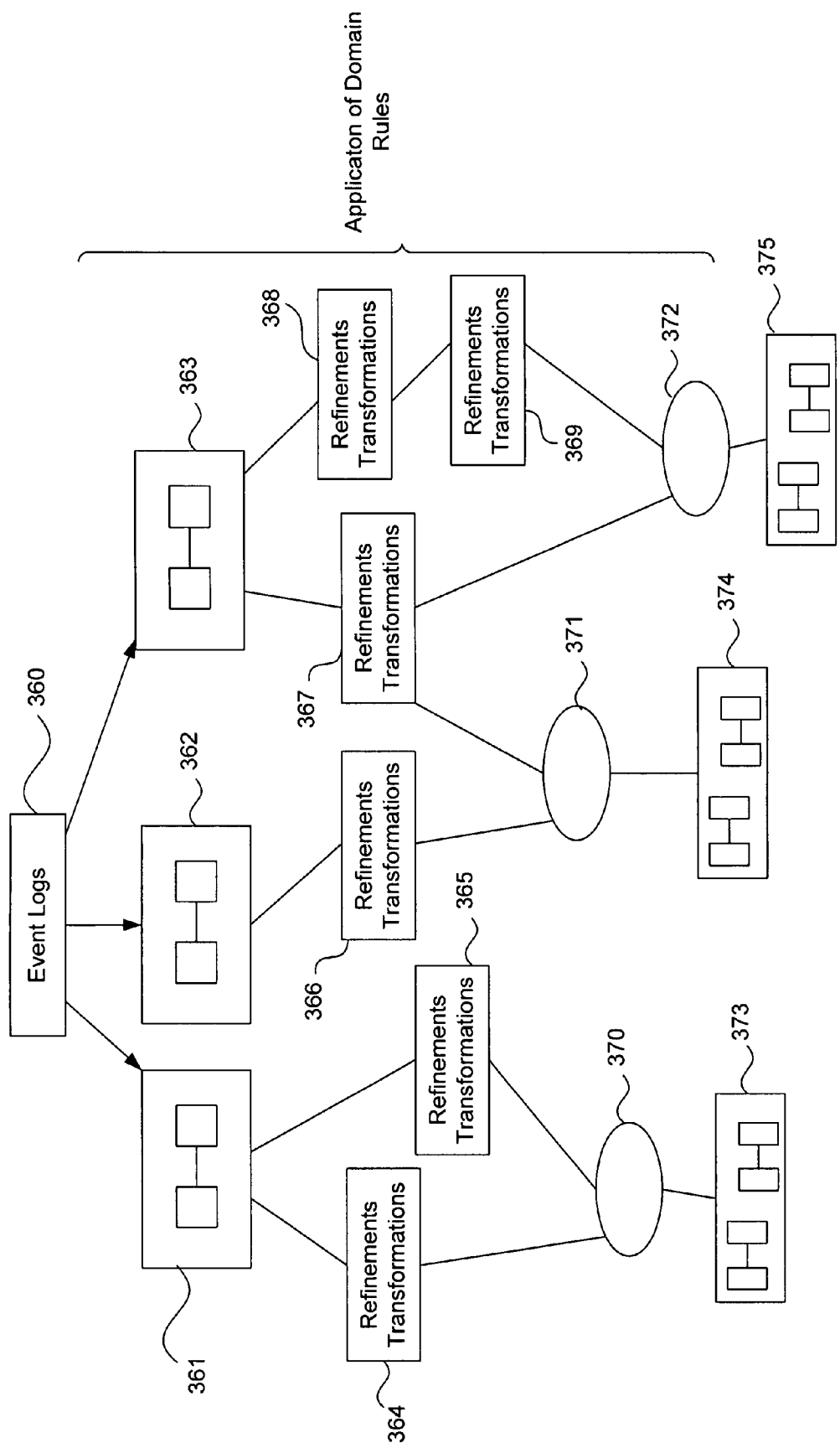
FIG. 3A illustrates a method of extracting business processes according to one embodiment of the present invention.

FIG. 3A illustrates a method of extracting business processes according to one embodiment of the present invention. When event logs 360 are accessed, the events may be analyzed using domain rules to extract basic business process components 361-363 (e.g., steps or schema elements). These basic components may include one or more atomic steps of a complete business process. From the basic business process components, domain rules may be applied to rebuild a complete business process from the component processes. For example, the basic business processes may be input to refinements or transformations 364-369 implemented using domain rules to recompose larger processes. As shown in FIG. 3A, one set of event logs may produce multiple business process components 361-363. The application of the rules to the component processes may cause multiple components processes, such as component 362 and 363, to be combined to form a complete business process 374. This may be an iterative process, for example, as illustrated at 370-372, wherein component processes may be iteratively pieced together to form the final process.

FIGS. 3B-C illustrate an example step of a business process and associated events according to an embodiment of the present invention. In this example, the business process is a credit check process 300. For example, as part of an electronic transaction, a software system 320 may execute a process for checking the credit of a buyer. To achieve this, software system 320 may request a credit check from another software system 330 that includes functionality for verifying credit. A complete business process may include a credit check component process as part of a larger transaction. The business process may include a first software system 320 (e.g., an agent) sending a credit check request to another software system 330. The second step of the process is when system 330 returns a verification (OK/Not OK) back to the requesting system. However, the actual processing steps performed to carry out the business process may be much more involved as illustrated in FIG. 3C. System 320 may start the process at 301 by generating and sending a request for a session key to system 330 to open a new session. Event 301 will be logged by system 320. Next, system 330 may receive the request at 302, generate a log entry that a request has been received, and then generate and send back a request for authorization at 303. The request for authorization made by system 330 will also be logged. At 304 the request for authorization is received by system 320 and the event logged. At 305, system 320 may access and send back an authorization code. Event 305 is also logged. The authorization code may be received by system 330 at 306, and the event of receiving the code is logged. After system 320 is authorized by system 330, system 330 may open a session by generating and sending an encrypted session key at 307 and logging the event. At 308, system 320 receives the session key and sends encrypted customer data at 309, such as an amount of credit to be checked, for example. These events are also recorded by system 320. At 310 and 311, system 330 receives the customer data, performs the credit check, returns an encrypted credit check result, and logs the associated events. At 312, system 320 receives the credit check result and logs the event, thereby completing the business process step. The events from the above transaction contain the information needed to determine that the business process being performed is a credit check process 300. For example, domain rules may be defined such that when events on a system (e.g., system 330) show that a request for a new session is received, an authorization code is requested, customer data received, and a credit check result transmitted, then the component process 300 may be extracted from the atomic events represented in the event logs. Similarly, domain rules could be defined for extracting the business process component from events logged on system 320. Likewise, domain rules could be defined for extracting business processes from multiple systems. In this example, the domain rules would pertain to business transactions, and in particular, credit check transactions. According to such rules, analysis of the events may be performed to specify the basic business process component that created them.

Figure 4:
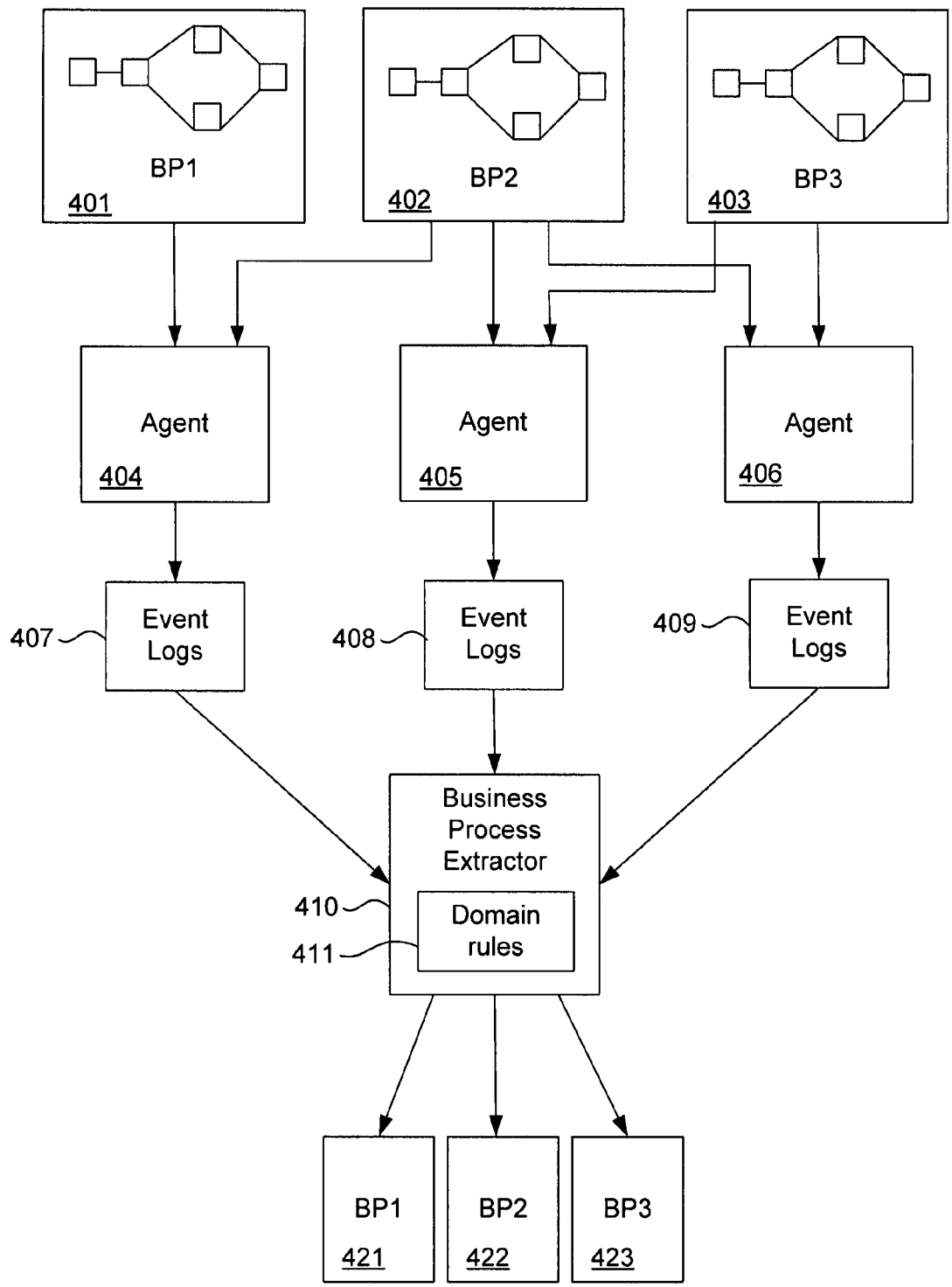
FIG. 4 illustrates derivation of multiple business processes according to one embodiment of the present invention.

FIG. 4 illustrates derivation of multiple business processes according to one embodiment of the present invention. In this example, three business processes may be executing across multiple systems. In particular, business process 401 may run on agent system 404. Accordingly, event logs 407 corresponding to this process will only be found on system 404. However, another business process 402 may run on agent systems 404, 405, and 406. Therefore, to derive this process it may be useful to obtain event logs 407, 408, and 409 from all three systems. Similarly, business process 403 may run on agent systems 405 and 406. Accordingly, event logs corresponding to process 403 may be found on systems 405 and 406. Embodiments of the present invention may include a business process extractor 410 ("BPE"). BPE 410 may retrieve event logs 407-409 from multiple systems and process the logs using predefined domain rules 411. The BPE 410 may filter or sort events to distinguish between different independent business processes. Two business processes are said to be independent if there is no information exchange going on between the processes. Once the separation has been done, event patterns may be detected and sub-protocols and/ or low-level business processes (e.g., the credit check process) may be identified and compiled. BPE 410 derives the business processes from the event logs and may output the business processes 421, 422, and 423, for example, as business process definitions or specifications.

Figure 5:
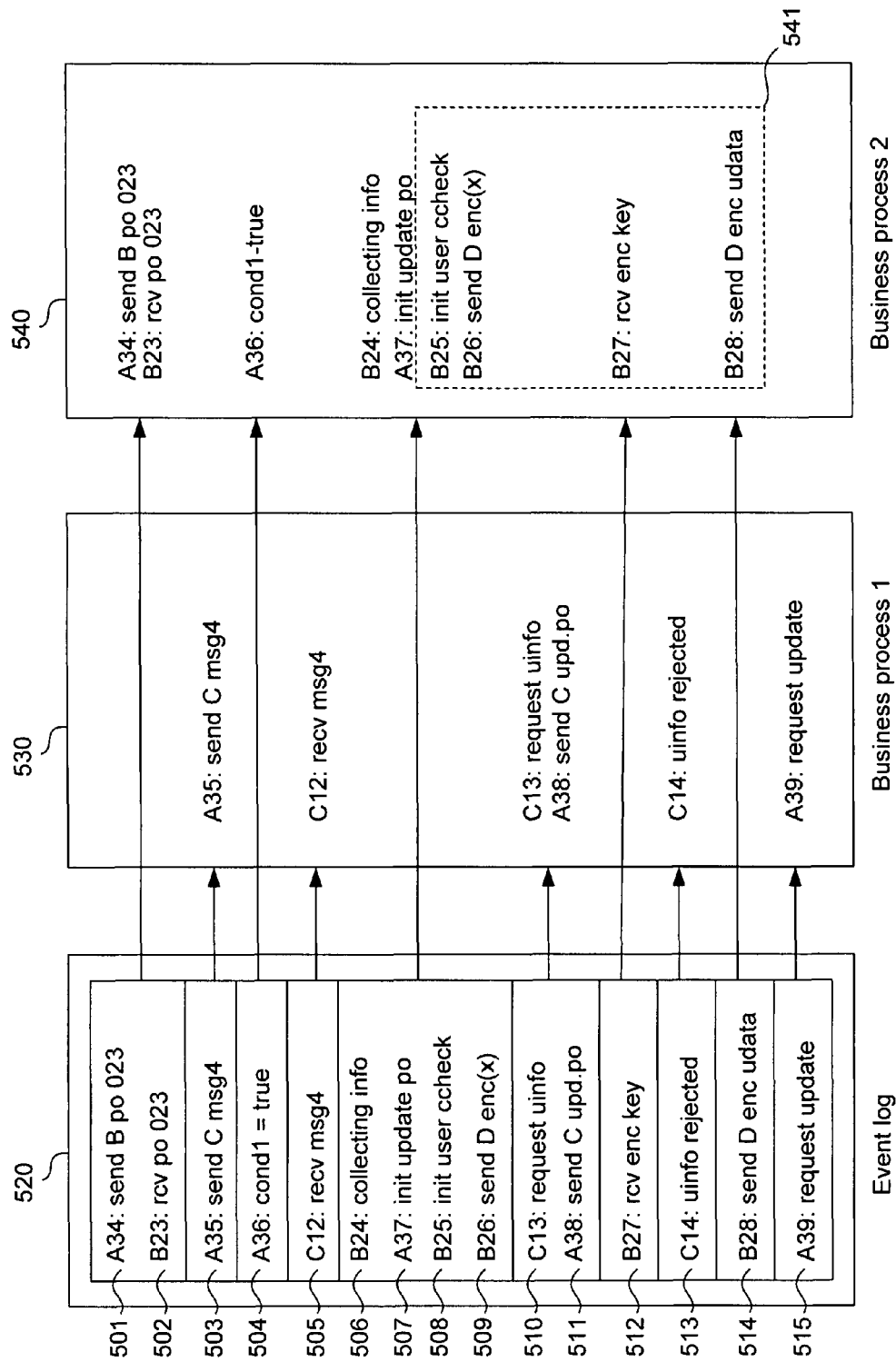
FIG. 5 illustrates clustering of events according to one embodiment of the present invention.

FIG. 5 illustrates clustering of events according to one embodiment of the present invention. A system may generate events corresponding to multiple different processes carried out on the system. FIG. 5 illustrates how events from a system event log may be associated with different business processes, or even an event cluster that represents a sub-process. If the events are logged together, it may be desirable to sort the events into groups (or "clusters") to derive the business processes that generated them. This process may also be used if multiple event logs from multiple systems are retrieved and combined on a single system for analysis. Event log 520 includes events for two different business processes 530 and 540. As a step in deriving the business process from the event logs, the events are separated into clusters. For example, events 501 and 502 are identified has belonging to business process 540 by analyzing the information associated with each log. Event 503 is associated with business process 530. Event 504 is associated with business process 540. Event 505 is associated with business process 530. Events 506-509 are associated with business process 540. In this example, events 503, 505, 510, 511, 513 and 515 form a cluster (or group) of events associated with business process 530, and events 501, 502, 504, 506-509, 512, and 514 form a cluster of events associated with business process 540. Similarly, events 508, 509, 512, and 514 may be identified as part of a sub-process of business process 540. Accordingly, these events may form a cluster associated with both business process 540 and a sub-process 541.

Figure 6:
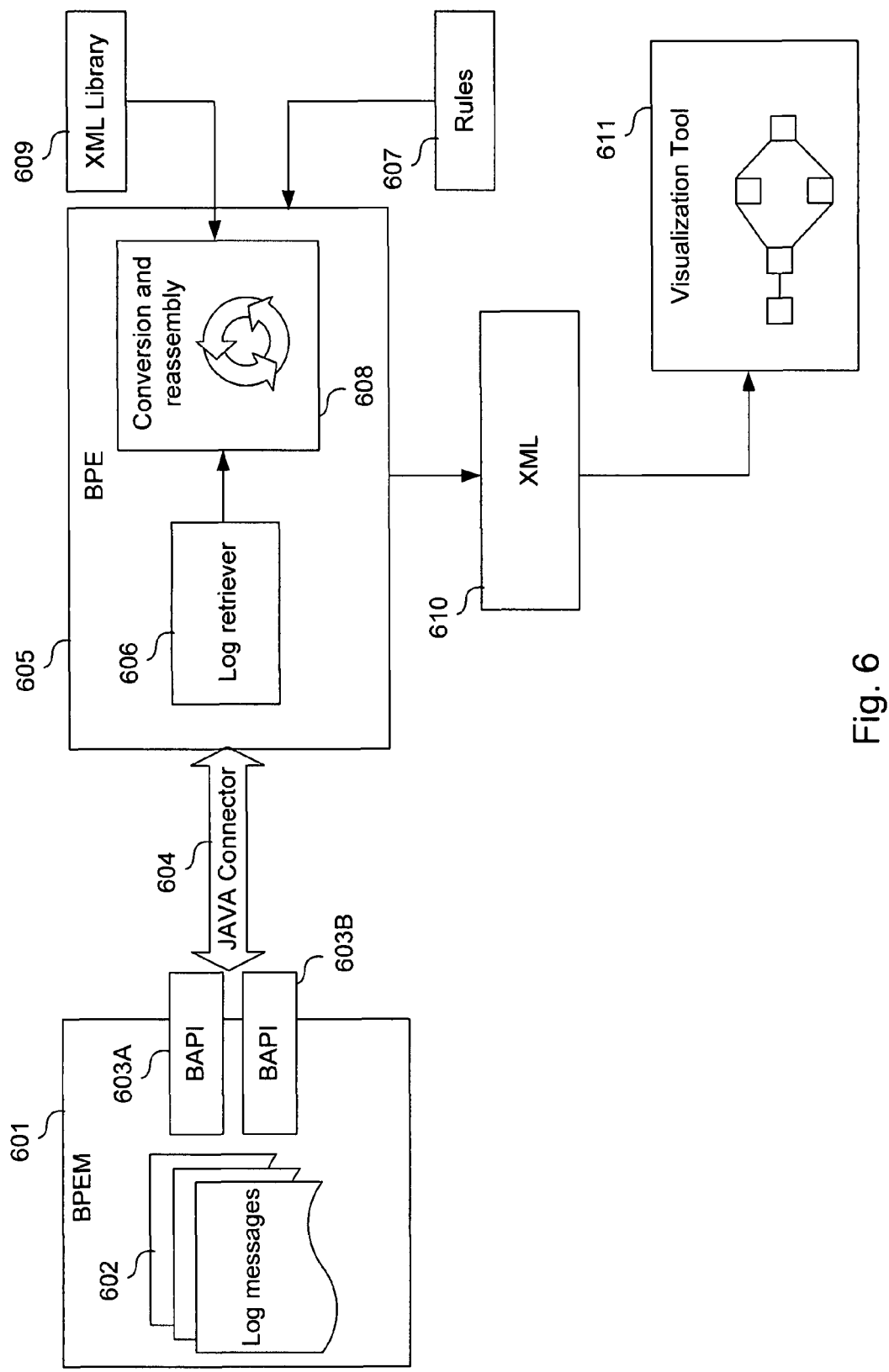
FIG. 6 is an example of a system for deriving business processes from event logs according to one embodiment of the present invention.

FIG. 6 is an example of a system for deriving business processes from event logs according to one embodiment of the present invention. In this example, a business process execution manager 601 ("BPEM") is used to execute business processes. The business processes may be defined using a business process markup language ("BPML") or other specification technique that is interpreted and carried out by the BPEM 601, for example. Execution of the business process causes the BPEM 601 to generate event log messages 602. The log messages are typically, but not necessarily, stored on the same system. In this example, a business process extractor 605 ("BPE") software system includes a log retriever component 606 for accessing the log messages. For example, log messages 602 may be retrieved by log retriever 606 using a JAVA connector 604 and business application program interfaces 603A or 603B. BPE 605 also includes a conversion and reassembly component 608. Component 608 may receive rules for deriving the business processes from the event logs. The rules may be defined by a domain expert with knowledge of the business processes to be extracted from the log files, for example. In one embodiment, BPE 605 may include a user interface for defining domain rules used to derive business processes from event logs. In this example, the derived business processes are output in an XML format. Accordingly, conversion and reassembly component 608 may be coupled to an XML library 609 for generating XML specifications of the derived business process and process components. In this example, the output of component 608 is an XML representation of the business process. The XML may be provided as an input to a visualization tool 611. The visualization tool may convert a specification of the business process, such as XML, into a graphical display of the business process, for example. In another embodiment, the XML may be provided as an input to a code generator for creating code to support the derived business process.

Figure 7:
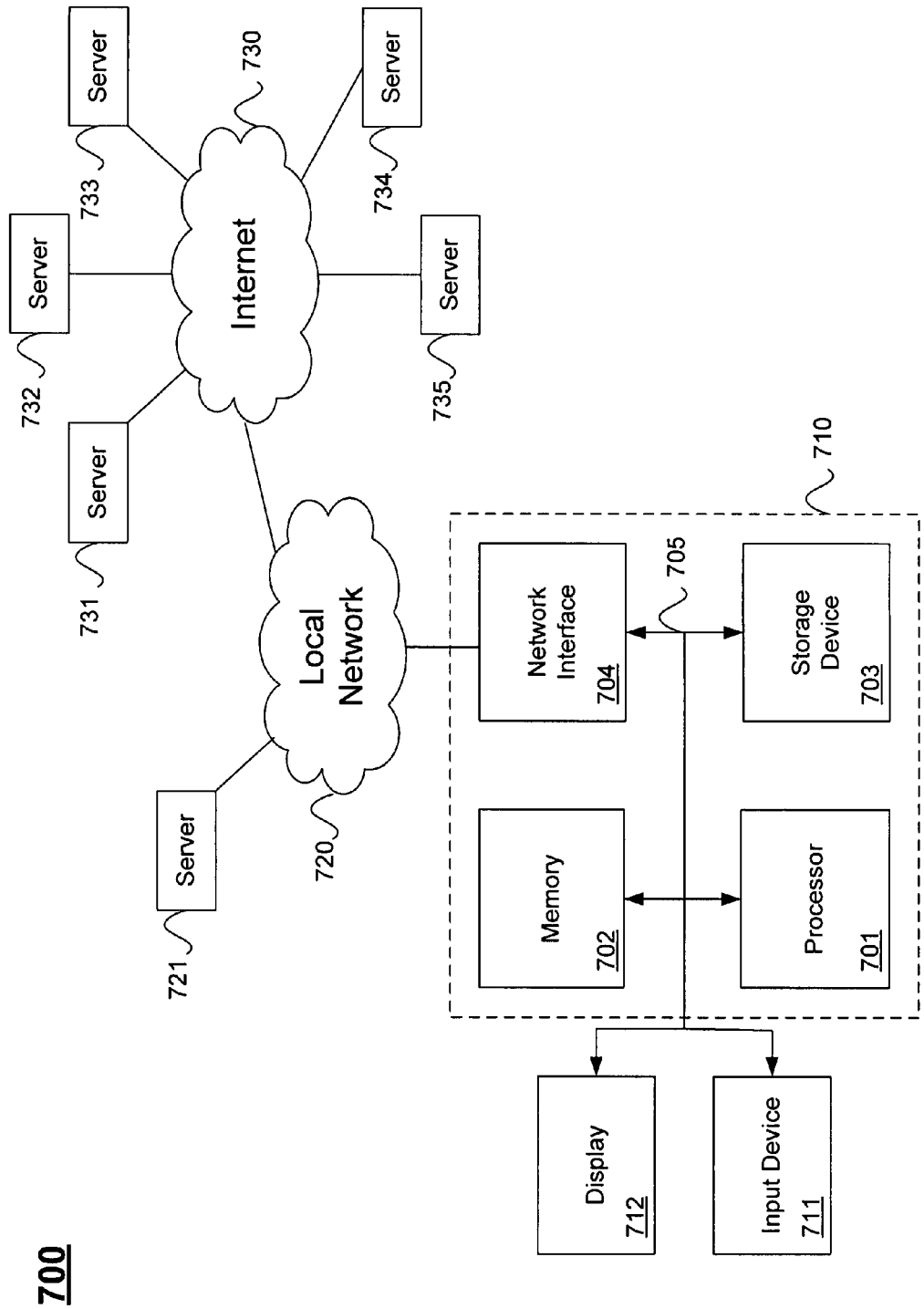
FIG. 7 illustrates an example computer system and networks that may be used to implement one embodiment of the present invention.

FIG. 7 illustrates an example computer system and networks that may be used to implement one embodiment of the present invention. Computer system 710 includes a bus 705 or other communication mechanism for communicating information, and a processor 701 coupled with bus 705 for processing information. Computer system 710 also includes a memory 702 coupled to bus 705 for storing information and instructions to be executed by processor 701, including instructions for performing the methods and processes described above. This memory may also be used for storing temporary variables or other intermediate information during execution of instructions to be executed by processor 701. Possible implementations of this memory may be, but are not limited to, random access memory (RAM), read only memory (ROM), or other similar computer-readable mediums. A storage device 703 is also provided for storing information and instructions. Common forms of storage devices include, for example, a hard drive, a magnetic disk, an optical disk, a CD, a DVD, a flash memory, a USB memory card, or any other medium from which a computer can read.

Computer system 710 may be coupled via the same or different information bus, such as bus 705, to a display 712, such as a cathode ray tube (CRT) or liquid crystal display (LCD), for displaying information to a computer user. An input device 711 such as a keyboard and/or mouse is coupled to a bus for communicating information and command selections from the user to processor 701. The combination of these components allows the user to communicate with the system.

Computer system 710 also includes a network interface 704 coupled with bus 705. Network interface 704 may provide two-way data communication between computer system 710 and the local network 720. The network interface 704 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 704 sends and receives electrical, electromagnetic, or optical signals that carry digital data streams representing various types of information.

Computer system 710 can send and receive information, including messages or other interface actions, through the network interface 704 to an Intranet or the Internet 730. In the Internet example, software components or services may reside on multiple different computer systems 710 or servers 731 across the network. Software components described above may be implemented on one or more local computers or servers. A computer system 710 may download event logs from one or more servers 731-735, through Internet 730, local network 720, and network interface 704 to be processed by a BPE on computer system 710, for example. This process of accessing events or rules or both may be applied to communication between computer system 710 and any of the servers 731 to 735 in either direction. It may also be applied to communication between any two servers 731 to 735.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method of deriving business processes, the method comprising:
   retrieving a plurality of event logs from a plurality of different systems executing a plurality of different business processes, wherein a first business process generates first event logs and a second business process generates second event logs;
   receiving domain rules from a domain expert;
   accessing the received domain rules;
   associating, on a computer system, the plurality of event logs with independent business processes using a plurality of the domain rules, wherein said first business process and said second business process corresponding to said first event logs and said second event logs, respectively, are common to at least one of said independent business processes, and wherein the first event lops and second event lops are clustered as subprocesses, and wherein independent business processes have no information exchange between them;
   deriving the independent business processes based on said associating; and outputting XML specifications for said independent business processes based on said deriving.

2. The method of claim 1 further comprising associating one or more event logs associated with the first business process with a sub-process of said first business process.

3. The method of claim 1 further comprising generating code to execute the business process.

4. The method of claim 1 further comprising deriving a plurality of business process components from the event logs based on the domain rules.

5. The method of claim 4 further comprising combining the business process components together to form a complete business process using said domain rules.

6. The method of claim 1 wherein event logs from multiple systems are retrieved and combined on a single system.

7. A non-transitory computer-readable medium containing instructions for controlling a computer system to perform a method of deriving business processes, the method comprising:
   retrieving a plurality of event logs from a plurality of different systems executing a plurality of different business processes, wherein a first business process generates first event logs and a second business process generates second event logs;
   receiving domain rules from a domain expert;
   accessing the received domain rules;
   associating the plurality of event logs with independent business processes using a plurality of the domain rules, wherein said first business process and said second business process corresponding to said first event logs and said second event logs, respectively, are common to at least one of said independent business processes, and wherein the first event logs and second event logs are clustered as subprocesses, and wherein independent
   business processes have no information exchange between them;
   deriving the independent business processes based on said associating; and outputting XML specifications for said independent business processes based on said deriving.

8. The non-transitory computer-readable medium of claim 7, the method further comprising associating one or more event logs associated with the first business process with a sub-process of said first business process.

9. The non-transitory computer-readable medium of claim 7, the method further comprising generating code to execute the business process.

10. The non-transitory computer-readable medium of claim 7, the method further comprising deriving a plurality of business process components from the event logs based on the domain rules.

11. The non-transitory computer-readable medium of claim 10, the method further comprising combining the business process components together to form a complete business process using said domain rules.

12. The non-transitory computer-readable medium of claim 7 wherein event logs from multiple systems are retrieved and combined on a single system.

* * * * *